June 26, 1956 M. L. TROTTER ET AL 2,752,052
TRUCK BODY WITH ELEVATOR FOR LOADING AND UNLOADING
Filed Oct. 12, 1953 4 Sheets-Sheet 1
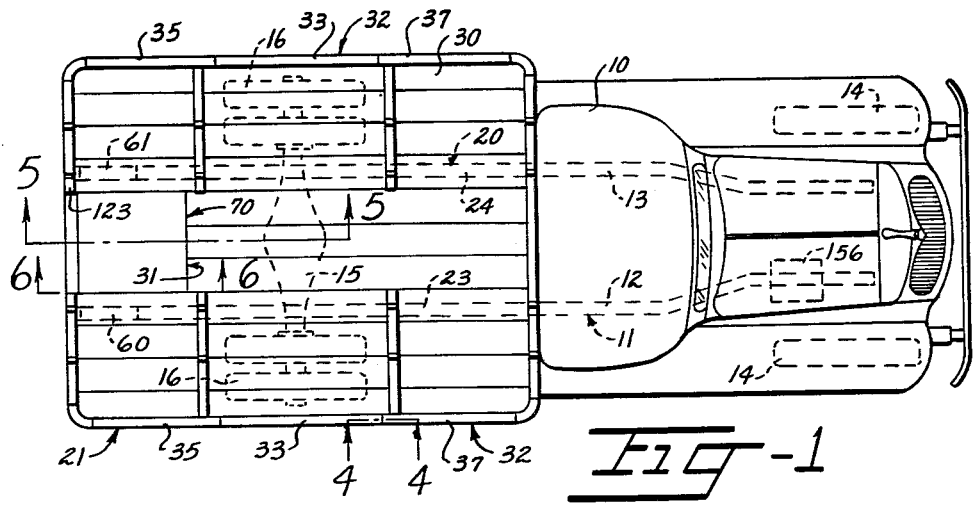
Fig-1
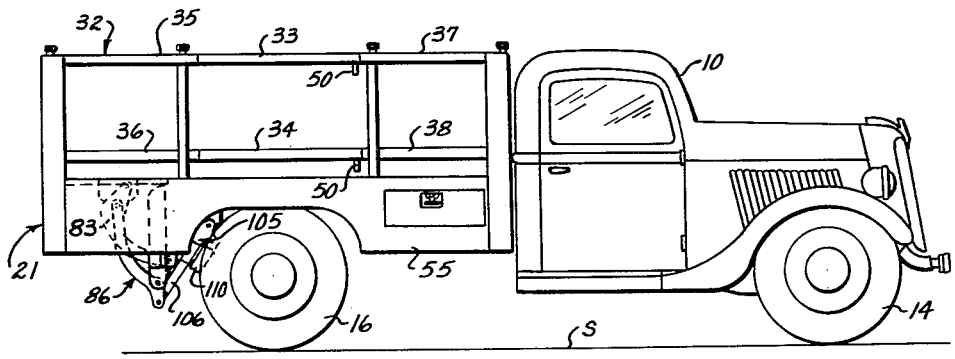
Fig-2
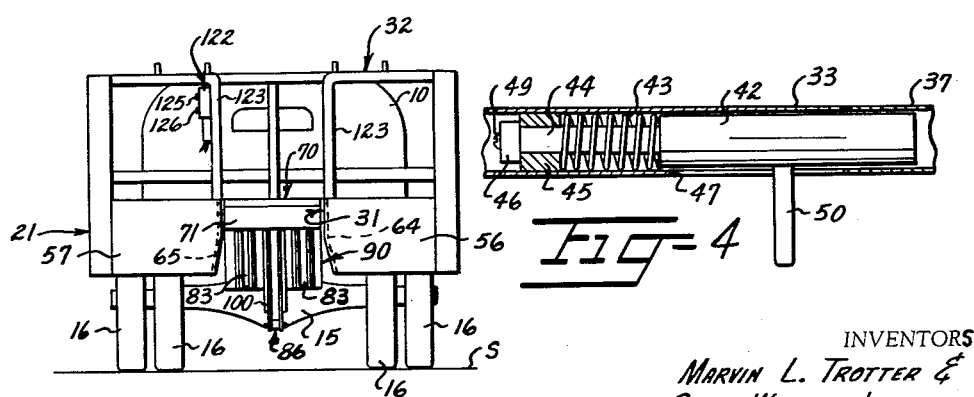
Fig-3
Fig-4
INVENTORS:
MARVIN L. TROTTER &
CECIL WAYNE JARVIS
BY Eaton + Bell
ATTORNEYS.

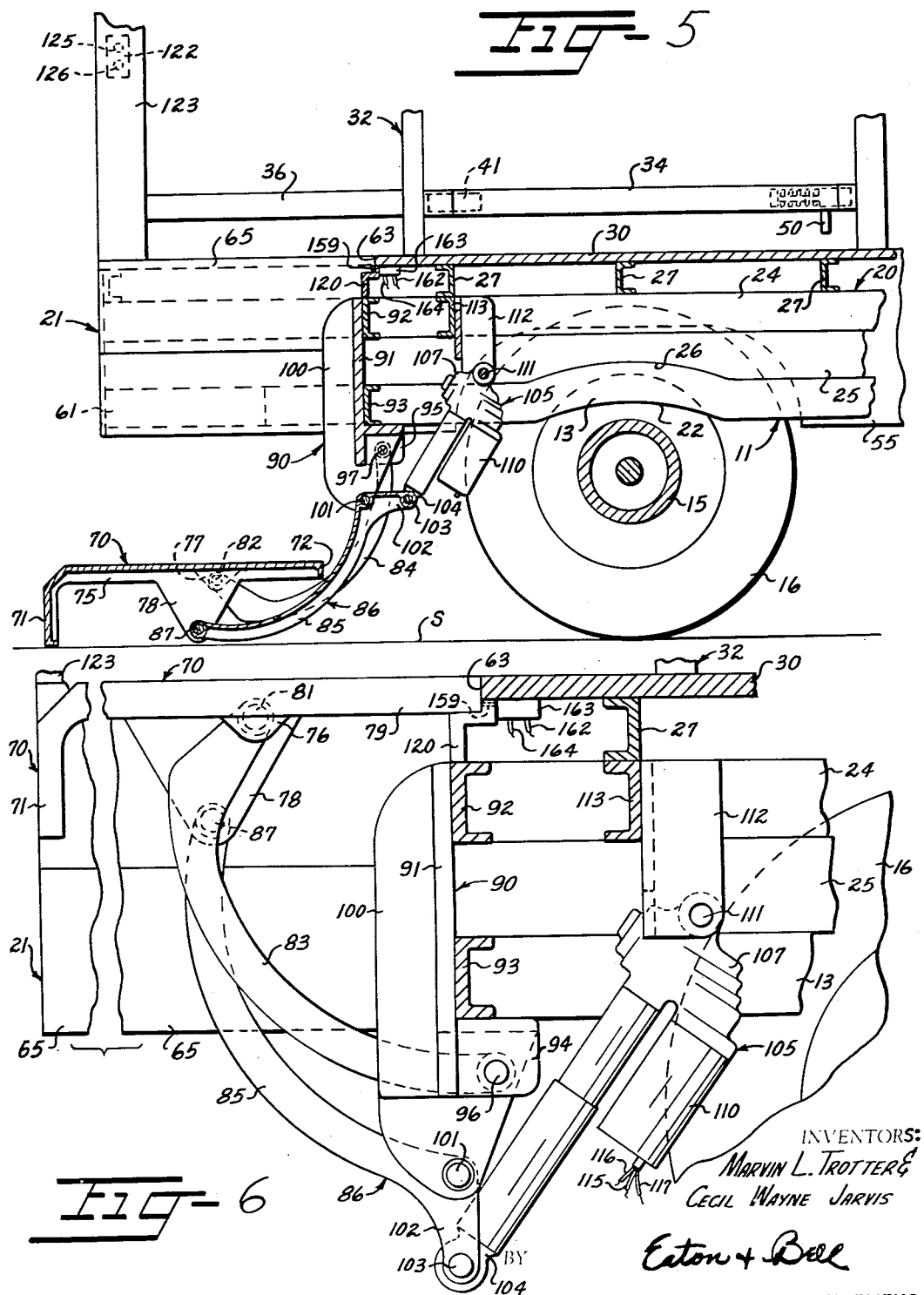

June 26, 1956 M. L. TROTTER ET AL 2,752,052
TRUCK BODY WITH ELEVATOR FOR LOADING AND UNLOADING
Filed Oct. 12, 1953 4 Sheets-Sheet 3

INVENTORS:
MARVIN L. TROTTER &
CECIL WAYNE JARVIS

BY Eaton + Bell
ATTORNEYS.

INVENTORS:
MARVIN L. TROTTER &
CECIL WAYNE JARVIS

BY Eaton & Bell

ATTORNEYS.

United States Patent Office 2,752,052
Patented June 26, 1956

2,752,052

TRUCK BODY WITH ELEVATOR FOR LOADING AND UNLOADING

Marvin L. Trotter and Cecil Wayne Jarvis, Columbia, S. C., assignors to Marvin L. Trotter, Columbia, S. C.

Application October 12, 1953, Serial No. 385,396

6 Claims. (Cl. 214—77)

This invention relates to a vehicle body having an improved electrically operated lift and it is the primary object of this invention to provide a lift platform adapted to be mounted on a truck and which may normally occupy a level position corresponding to the level of the floor of the truck bed and which has electrically operable means for lowering the same in the course of which the platform remains in a level attitude so that relatively heavy objects, such as acetylene and propane gas cylinders, may be placed on the elevator platform while it is in a lowered position upon the ground or floor upon which the truck is resting and, whereupon the elevator platform may be automatically raised to a level substantially the same as that of the floor of the truck bed to enable the operator to easily move the article thus raised onto other portions of the floor of the truck bed.

More especially, it is an object of this invention to provide a lift or elevator platform adapted to loosely fit in a correspondingly shaped opening or well provided therefor in the floor of the truck bed and wherein a novel arrangement of parallel links is provided. Corresponding ends of the links are connected to the lower portion of the elevator platform and are connected at their other ends to hanger frame members depending from the truck bed or connected to the frame of the truck below the floor of the truck bed, and an electrically operated ram is connected to at least one of said links for imparting movement thereto for lowering and raising the elevator platform and whereby the link arrangement is such that the platform is maintained in a level position throughout its vertical movement.

It is another object of this invention to provide a device of the type described wherein safety means are provided for stopping the engine of the vehilce with which the elevator is associated simultaneously with the electrically operable motor of the elevator being manually activated.

It is another object of this invention to provide a truck body particularly adapted for handling relatively small heavy objects such as cylinders of liquified petroleum gas and wherein a truck bed is provided adapted to fit upon the chassis of a conventional truck, said truck bed being divided into compartments for receiving and holding a plurality of cylinders or the like in upright position. The truck bed has a well in the rear end thereof in which an electrically operable elevator platform is mounted for generally vertical movement to facilitate loading and unloading said cylinders, the rear end of the elevator platform being flush with the rear end of the truck bed.

Some of the objects of the invention having been stated, other objects will appear as the description proceeds when taken in connection with the accompanying drawings, in which—

Figure 1 is a top plan view of a typical truck with the improved truck bed and elevator thereon;

Figure 2 is a side elevation of the truck showing the improved body and elevator or lift;

Figure 3 is a rear elevation of the truck looking at the left-hand side of Figure 2;

Figure 4 is an enlarged fragmentary longitudinal sectional view taken substantially along line 4—4 in Figure 1 and showing an improved means for connecting a removable gate to one side of the truck bed;

Figure 5 is an enlarged fragmentary vertical sectional view taken substantially along line 5—5 in Figure 1, but showing the improved elevator in lowered position for receiving an article to be lifted thereby to the level of the floor of the truck bed;

Figure 6 is an enlarged fragmentary view, taken along the line 6—6 in Figure 1, of the truck bed with the elevator in raised position, with parts broken away and other parts in section;

Figure 7:
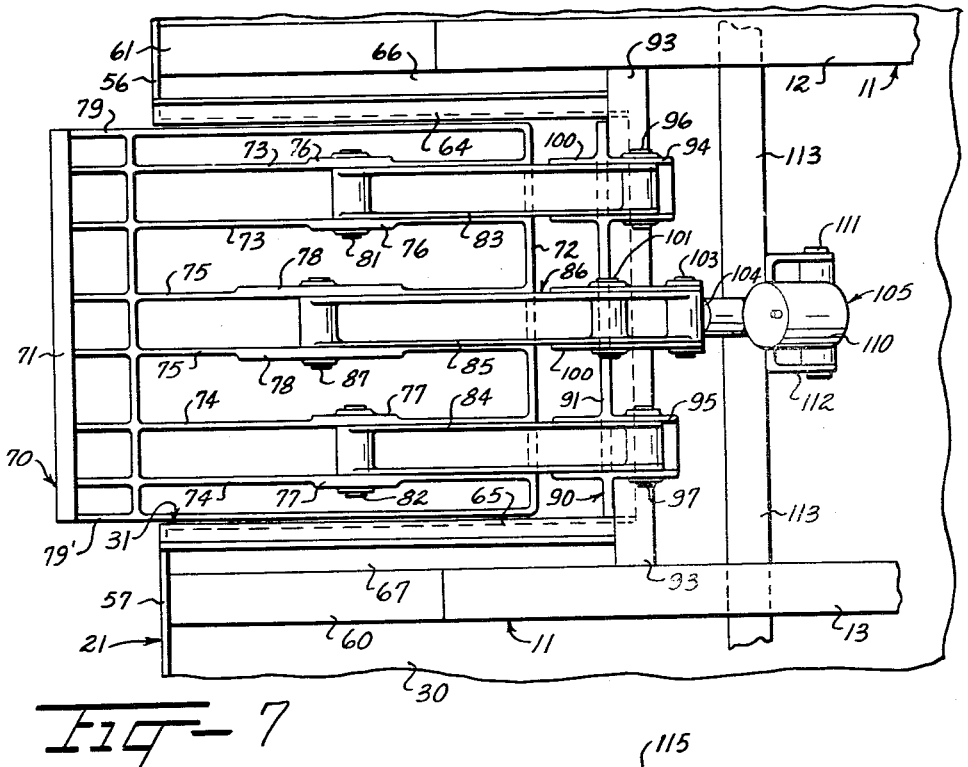
Figure 7 is an inverted plan view of the rear central portion of the truck bed shown in Figure 2, showing the improved elevator or lift in elevated or raised position.

Referring more specifically to the drawings, the numeral 10 indicates the cab of a vehicular truck which is mounted upon a chassis broadly designated at 11 and including longitudinally extending main frame members 12 and 13 which are supported in the usual manner by front ground wheels 14 and a rear axle housing 15 mounted on rear ground wheels 16, which rear ground wheels 16 are shown as being dual wheels in Figures 1 and 3.

Supported on the longitudinally extending frame members 12 and 13 of the truck chassis 11 is a truck bed frame broadly designated at 20 which supports a truck body broadly designated at 21. The frame members 12 and 13 of the truck bed extend rearwardly beyond the axle housing 15 and are usually provided with an upwardly curved portion 22 which extends over the axle housing 15. The bed frame 20 includes longtiudinally extending frame members 23 and 24 which are spaced above the rear portions of the respective chassis frame members 12 and 13 by means of spacing bars 25, only one of which is shown in Figure 5. The spacing bars 25 are preferably made from wood and each is cut away, as at 26, to fit the upwardly curved portion 22 on each of the longitudinally extending chassis frame members 12 and 13. Supported on the bed frame members 23 and 24 are a plurality of transverse frame members 27, which are shown in the form of channel bars, and on which a floor 30 of the truck bed 21 is suitably secured.

The rear end of the floor 30 of the truck body 21 is provided with a substantially rectangular elevator opening or well 31 for accommodating the improved elevator or lift.

A suitable pipe railing 32 extends around and is spaced above the side front and rear edges of the floor 30 of the truck body 21, said railing 32 being provided with an opening at the rear end of the truck body 21 coinciding with the opening 31 in the floor 30 of the truck body 21. Each side of the railing 32 is cut away to provide space for a removable gate or upper and lower removable pipe sections 33 and 34. The portion of the railing 32 at each side of the truck body 21 includes upper rear pipe sections 35 and 36 and upper and lower horizontal front pipe sections 37 and 38, the removable upper gate pipe section 33 being normally positioned between the spaced proximal ends of the rear and front upper pipe sections 35 and 37 and the removable lower gate pipe section 34 at each side of the truck body 21 being positioned between the proximal ends of the corresponding lower rear and front pipe sections 36 and 38.

Novel means are provided for connecting opposite ends of the upper and lower gate pipe sections 33 and 34 to the respective upper and lower stationary pipe sections 35, 37 and 36, 38, as best shown in Figures 4 and 5. To this end, it will be observed in Figure 5 that each of the removable gate pipe sections 33 and 34 has one end of a pilot block 41 fixed therein, as by being pressed thereinto and which projects outwardly therefrom in axial alinement therewith and is adapted to slidably fit in the corresponding stationary rear pipe sections 35 and 36. The ends of each of the removable gate pipe sections 33 and 34 opposite from the end thereof having the pilot bar or block 41 therein has a latch plunger 42 mounted for longitudinal sliding movement therein which normally projects outwardly beyond the corresponding end of each of the removable gate pipe sections 33 and 34 and is adapted to loosely fit in the corresponding end of the corresponding front upper and lower stationary pipe sections 37 and 38. Referring to Figure 4, it will be observed that each of the latch plungers 42 is normally urged outwardly by a compression spring 43 which encircles a reduced portion 44 integral with the latch plunger 42 and which reduced portion is mounted for axial movement in a block 45 suitably secured in the corresponding removable pipe section.

The reduced portion 44 of each latch plunger 42 has an enlarged head portion 46 suitably secured on the inner end thereof such as by a screw 49 which is adapted to engage the block 45 to limit outward movement of the latch plunger 42. Each of the upper and lower gate pipe sections 33 and 34 has a longitudinally extending slot 47 adjacent the end corresponding to the plunger 42 through which slot 47 a handle or manipulating pin 50 loosely extends, the pin 50 being fixed to the corresponding latch plunger 42.

Thus, in order to remove either of the gate pipe sections 33 or 34, it is only necessary for the operator to grasp the handle 50 and move the same inwardly to move the free end of the plunger 42 out of engagement with the corresponding front stationary pipe section and whereupon the corresponding upper or lower gate pipe section 33 or 34 may be swung outwardly and easily removed from the railing 32. Thus, objects or articles which are too large or bulky to be mounted on or removed from the floor 30 of the truck body 21 through the opening defined by the proximal portions of the railing 32 at the rear end of the truck bed; that is, above the well 31, may be loaded and unloaded by removing the corresponding upper and lower gate pipe sections 33 and 34 in the manner described.

*Details of elevator*

Each longitudinal side edge of the floor 30 of the truck body 21 has suitable skirting 55 depending therefrom and rear skirt panels 56 and 57 depend from the rear edges of the portions of the floor 30 which define opposite sides of the opening 31. The rear ends of the chassis frame members 12 and 13 have respective chassis frame extensions 60 and 61 suitably connected to the lower surfaces of the corresponding spacing members 25 and forming part of the truck bed and which may be connected to the ends of the members 12 and 13. The skirt panels 56 and 57 may be suitably secured to the rear ends of the corresponding frame members 23 and 24. Thus the truck body 21 is a complete unit adapted to fit on any suitable chassis.

The front edge or wall of the well 31, defined by the rear edge of the corresponding center portion of the floor 30, is indicated at 63 and opposite side edges of the well 31 are provided with side walls or panels 64 and 65 suitably secured to, and depending from, the floor 30 of the truck body 21. Suitable spacing frame members 66 and 67 (Figure 7) may be suitably secured to the proximal surfaces of the rear portions of the frame members 23, 24, the spacer members 25 and the chassis extensions 60 and 61, if desired, for supporting the side walls 64 and 65. The elevator well side walls 64 and 65 preferably flare outwardly in diverging relation as shown in Figure 3 to insure that the improved elevator platform broadly designated at 70, may freely pass between the side walls 64 and 65 of the well 31 in the course of upward movement thereof.

The improved elevator or lift platform 70 is preferably, but not necessarily, of cast construction and has a downwardly projecting foot portion 71 depending from the rearmost edge thereof which is adapted to rest upon the ground or surface S upon which the wheels 16 of the truck are resting when the elevator platform 70 is in lowered position. The front edge of the elevator platform 70 also preferably has a reinforcing flange 72 depending therefrom and three sets of two spaced ribs 73, 74 and 75 extend longitudinally beneath the platform 70 as best shown in Figure 7. The side edges of the platform 70 have downwardly projecting ribs 79 and 79'. The ribs 73 have spaced relatively short ears 76 depending therefrom and the ribs 74 have spaced relatively short ears 77 depending therefrom which are disposed in substantially axial alinement with the ears 76. The ribs 75 have spaced relatively long ears 78 depending therefrom which are substantially triangularly shaped and the lower ends of which are disposed rearwardly of the lower ends of the ears 76 and 77.

The ears 76 and 77 have respective axially alined rear pivot shafts 81 and 82 therein to which the rear ends of respective links 83 and 84 are pivotally connected. The rear end of a power link 85, which is a part of a bell crank or lever broadly designated at 86, is pivotally mounted on a rear pivot shaft 87 mounted in the lower ends of the ears 78.

In order that the parallel links 83 and 84 clear the lower edge of the reinforcing transverse flange 72 when the elevator platform is in lowered position, as shown in Figure 5, each of the links 83 and 84 extend straight at an angle tangent to the respective pivot shafts 81 and 82 and then is curved throughout the remainder of its length. The opposite end of each of the links 83 and 84 is pivotally connected to an elevator supporting frame broadly designated at 90.

The elevator supporting frame 90 is preferably of cast or drop-forged construction and comprises a vertically disposed transverse plate portion 91 which is suitably secured to respective upper and lower transverse frame members 92 and 93. Opposite ends of the upper transverse frame member 92 are suitably secured to the said frame members 23 and 24 and opposite ends of the lower transverse frame member may be suitably secured to the chassis frame members 12 and 13. The lower edge of the plate member 91 terminates substantially below the lower surface of the lower transverse frame member 93 and has two pairs of ears 94 and 95 projecting forwardly therefrom which have respective front pivot shafts 96 and 97 mounted therein to which the inner ends of the respective links 83 and 84 are pivotally connected.

Figure 10:
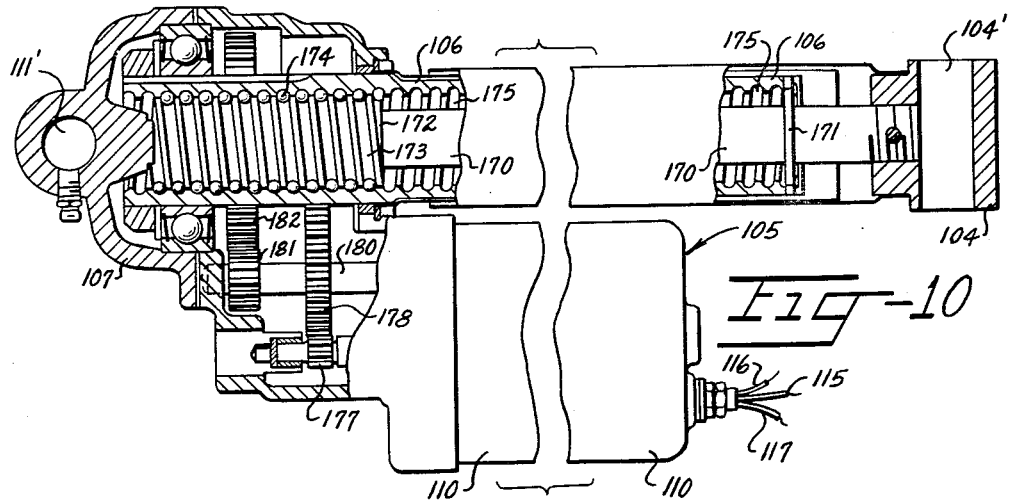
Figure 10 is an elevation, with parts broken away, of the lift driving unit for operating the lift.
Figure 11:
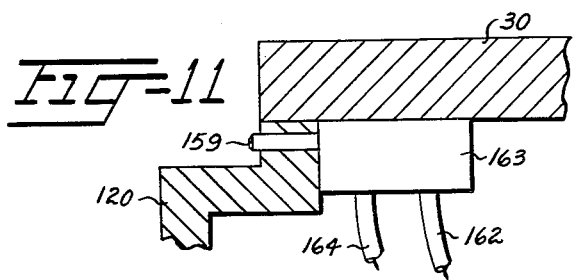
Figure 11 is an elevation of the switch 163, in the upper portion of Figure 5, on an enlarged scale and showing adjacent portions in section.

Projecting rearwardly from the medial portion of the vertically disposed transverse plate portion 91 of the frame 90 are spaced upright fins 100 which extend downwardly substantially below the level of the ears 94 and 95 and have a bell crank pivot shaft 101 mounted therein and extending therebetween on which the lever 86 is pivotally mounted. The lever 86 has an arm 102 extending forwardly therefrom which is pivotally connected, at 103, to a screw-and-nut actuator driven through gearing means by an electric motor, in other words designated as a ram or piston 104 and an electrical power unit 105. (See Figure 10.)

The ram 104 has a bore 104' therethrough (Figure 10) which is penetrated by the bolt 103. The ram 104 is fixedly secured to a shaft 170 loosely mounted in a sealing washer 171 in a stem portion 106. The stem 106 extends from a gear housing 107 which has a bore 111' penetrated by a pin 111 mounted in a bracket 112. The bracket 112 is fixedly secured to and depends from a transverse frame member 113, the opposite ends of which are secured to the frame members 23 and 24.

The shaft 170 has an enlarged end portion 172 which is threaded, as at 173, for receiving balls 174 which are mounted in internal threads 175 which extend throughout the length of the interior surface of the portion 106. The threads 173 are closed at both ends so as to cause the balls 174 to be carried along by the enlarged portion 172. The electric motor 110 has a pinion 177 secured on its shaft which meshes with a pinion 178 mounted on a shaft 180. Shaft 180 has a pinion 181 fixed thereon which meshes with a pinion 182 fixed on the portion 106 whereby, when the electric motor 110 is energized, it rotates the tubular portion 106 which, through the threads 175 and balls 174, will move the shaft 170 to the right or to the left in Figure 10 to raise or lower the elevator platform 70.

The reversible electric motor 110 has wires 115, 116 and 117 extending therefrom which are parts of an electrical circuit to be described. A suitably formed sill frame member 120 is suitably secured at its lower end to the upper surface of the upper transverse frame member 92 and has a shoulder formed thereon upon which the flanged front end 72 of the elevator platform 70 is positioned, when the elevator platform 70 is in the raised or elevated position as is most clearly shown in Figure 6.

It is thus seen that, upon energization of the electric motor 110 to cause the same to rotate in one direction, the lift arm or link 86 will cause the elevator platform 70 to be raised or lowered, as the case may be, between the position shown in Figure 5 and that shown in Figure 6 while maintaining the same in a level attitude. It should be noted that, as the platform 70 moves downwardly from raised position, it also moves rearwardly relative to the truck body 21 in an arcuate path so as to be readily accessible to the operator for positioning articles thereon.

One of the important features of the present invention is the manner in which the elevator platform 70 is maintained in a level attitude throughout its coures of movement. The bell crank 86 acts as a power lift and its curvature and pivot points are such as to move the platform in an arc while at the same time keeping it level relative to the truck bed. The arms or links 83 and 84 are curved and pivoted to the platform 70 at a point higher than the point at which the bell crank 86 is pivotally connected to the platform and this lends stability to the platform and the different spacing of the pivot points causes the platform to maintain a level attitude.

Now, the electric motor 110 is controlled by a manually operable two-position reversing switch broadly designated at 122 which, as shown in Figure 3, is preferably secured to one of a pair of upright posts 123 disposed at opposite sides of the well 31 and which supports corresponding portions of the railing 32 heretofore described.

Figure 8:
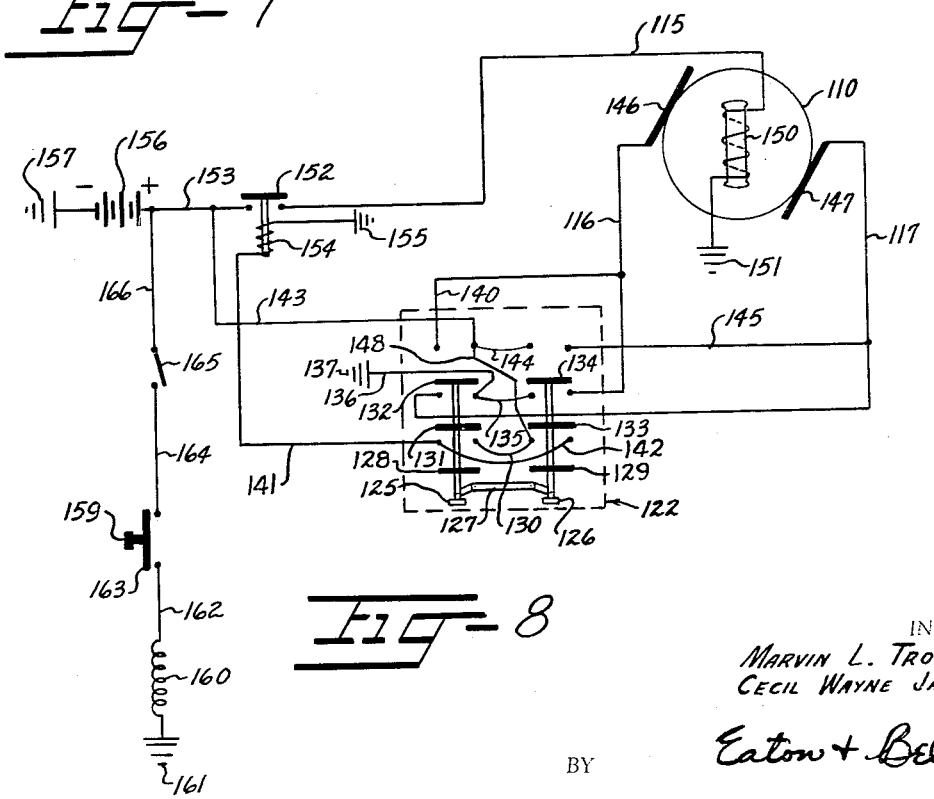
Figure 8 is a schematic diagram showing the electrical connections between the elevator lift driving element and the manual switch for controlling the same.
Figure 9:
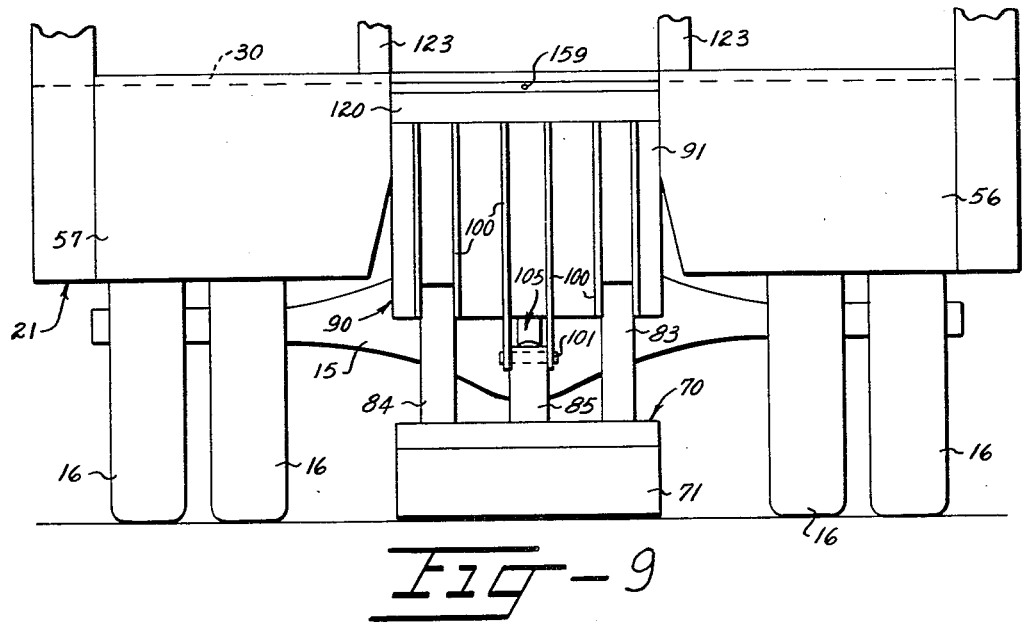
Figure 9 is a rear elevation of the lift and associated parts looking at the left hand side of Figure 5.

Referring to Figure 8, it will be observed that the switch 122 has a pair of push buttons 125 and 126 thereon which are connected to opposite ends of a link 127 shiftably supported in the housing of the switch 122. The push buttons 125 and 126 are normally urged outwardly to the position shown in Figure 8 and control the position of respective bus bars 128, 131, 132, and 129, 133, 134. Switch 122 is preferably of a type in which only one of the push buttons 125 or 126 may be manually depressed or actuated at one time and wherein suitable spring means, not shown, causes the push buttons to return to inoperative position when they are released by the operator. The switch 122 may be of a type manufactured by Cutler-Hammer, Inc., 1418 St. Paul Ave., Milwaukee, Wisconsin, under their bulletin No. 9109H3B.

It should be noted that, when the push buttons 125 and 126 are in normal or open position, the respective bus bars 128, 131, 132 and 129, 133, 134 controlled thereby do not engage any of the contacts of the switch 122. However, upon the operator depressing the push button 125, the bus bar 128 establishes contact between wires or conductors 141, 142 and 130, 148. Also, the bus bar 131 then establishes contact between the wire or conductor 117 and two wires or conductors 135 and 136, the wire 136 being grounded, as at 137. At the same time, the bus bar 132 establishes contact between corresponding ends of wires or conductors 143, 144 and 148 and a wire or conductor 140.

As heretofore stated, the switch 122 is of the type which, upon either of the push buttons 125 or 126 being released, both of the push buttons return to the open position shown in Figure 8. Thus, when the push button 126 is depressed, the bus bars 129, 133, 134 move inwardly and, in so doing, the bus bar 129 establishes contact between wire 142 and wires 130, 148. Also the bus bar 133 then establishes contact between the wires 116 and 135 while the bus bar 134 establishes contact between the wire 144 and a wire or conductor 145. The end of the wire 140 remote from switch 122 is connected intermediate the ends of wire 116 and the end of wire 145 remote from switch 122 is connected intermediate the ends of wire 117.

Now, the electric motor 110 is of the direct current type, since a direct current source of electrical current is usually used with automotive vehicles. Therefore, the wires 116 and 117 are connected to respective field coils 146 and 147 of the electric motor 110 and the wire 115 is connected to one side of the armature 150 of the electric motor 110, the other end of the armature 150 being grounded, as at 151. The end of the wire 115 remote from the electric motor 110 is connected to one side of a solenoid switch or relay 152, to the other side of which a lead wire 153 is connected. The solenoid switch 152 is controlled by a coil 154, to one end of which the end of the wire 141 remote from the switch 122 is connected; the end of said coil 154 remote from the wire 141 being grounded, as at 155. The end of the wire 143 remote from the switch 122 is connected intermediate the ends of the lead wire 153, which lead wire is also connected to a suitable source of direct current such as a storage battery 156 suitably grounded as at 157.

The storage battery 156 is disposed in the usual position as shown schematically in Figure 1 and controls the flow of electrical energy to the spark coil which, of course, controls the operation of the engine of the truck. The spark coil is indicated in Figure 8 at 160 and one end thereof is grounded at 161 and the other end thereof has a wire 162 extending therefrom to one side of a normally open safety switch 163. The safety switch is suitably secured to the lower surface of the floor 30 of the truck body 21 as shown in Figure 5 and the plunger 159 thereof projects through the sill member 120 so as to be engaged by the front surface of the flange portion 72 of the elevator platform 70 when the elevator platform 70 is in raised or elevated position as shown in Figures 1, 2, 3 and 6.

The side of the switch 163 remote from the wire 162 has one end of a wire 164 connected thereto whose other end is connected to one side of the usual ignition switch 165. The other side of the ignition switch 165 has a wire 166 connected thereto whose other end is connected intermediate the ends of the lead wire 153.

It is thus seen that, upon depressing the push button 125 of switch 122, thereby moving the bus bars 128, 131, 132 inwardly, current flows from battery 156 through wires 153, 143, 148, 130 through bus bar 128, through wire 141 and coil 154, which is grounded at 155, thereby energizing the coil 154 and closing the relay 152. It is evident that this causes electrical energy to flow through the wire 115 and armature 150 of the electric motor 110.

Also, as the push button 125 is depressed, current flows from the bus bar 132, through the wires 140 and 116 to the field coil 146 to positively energize the field coil 146.

The field coil 147 is then negative, since current flows therethrough and thence through the wire 117, bus bar 131 and wire 136 which is grounded at 137. Thus, the electric motor 110 is caused to rotate in one direction and wherein it is to be assumed that this will cause the ram 104 to move toward the rear housing 107 of the power unit 105. It is evident that this will cause the elevator platform 70 to move downwardly from the raised position shown in Figure 6 to the lowered position substantially as shown in Figure 5.

As the elevator platform 70 is lowered, the flange 72 thereon moves out of engagement with the plunger of the switch 163, thus permitting the switch 163 to open and to thereby insure that the circuit to the spark coil 160 is broken in the event of the ignition switch 165 being closed to thus stop the truck engine immediately upon activation of the elevator platform 70 to further insure that the truck cannot be moved while the elevator platform 70 is in any position other than fully raised. Of course, when the elevator platform 70 has been lowered to the desired level, the operator releases the push button 125 which then returns to the open position shown in Figure 8.

In order to reverse the electric motor 110, for raising the elevator platform 70, the push button 126 is depressed which causes the bus bars 129, 133, 134 to move inwardly. In so doing, the coil of the magnetic or solenoid switch 152 is again energized, since current then flows from the lead wire 153, through the wire 143, 148, through the bus bar 129 and through wires 142 and 141 to the coil 154 which is grounded at 155. This again completes the circuit to the armature 150 of the electric motor 110.

Also, since the bus bar 134 is then in its inward or closed position, current flows from the wire 144, through the wires 145 and 117 to the field coil 147 to thereby positively energize the field coil 147. The current continues through the field coil 147 and to field coil 146 which is negative, since current flows from the field coil 146, through the wire 116, through the bus bar 133, through the wires 135 and 136 and is grounded at 137.

Since the flow of current through the field coils 146 and 147 is then opposite from that direction in which it flows when the push button 125 is depressed, it is evident that the electric motor will then rotate in the reverse direction to cause the ram 104 to move outwardly relative to the gear housing 107 and to thereby move the elevator platform 70 upwardly to the desired level. When the elevator platform 70 is in fully raised position, the flange 72 thereon again engages and depresses the plunger of the switch 163 for closing switch 163, whereupon the ignition switch 165 will then be effective to close the circuit to the spark coil 160.

It is thus seen that there is provided an improved electrically operable elevator or lift for vehicular trucks and the like, wherein the curved formation of the links 83, 84 and 85 is such as to permit the elevator platform 70 to be lowered to where the rear flange 71 thereof may rest upon the same level as the rear wheels 16 of the truck. This further facilitates a compact elevator which is of simple and economical construction and may be readily mounted on any type of wheeled conveyance having a source of electrical current thereon.

The advantages of an electrically operable elevator platform over the prior attempts to provide a satisfactory hydraulically operable elevator platform for automotive trucks are evident in that no bulky machinery is required to operate an electrically operable platform which enables the platform to be flush with the rear edge of the truck bed and disposed within a well in the bed of the truck instead of protruding beyond the rear edge of the bed as has heretofore been the practice. Also, it is necessary to operate the truck engine to furnish power to the hydraulic systems heretofore in use, while an electrically operable elevator may be operated from the truck's storage battery without running the engine. In fact, in the preferred form of the invention this is preferable to eliminate the danger of dragging a lowered elevator over the ground.

In the drawings and specification there has been set forth a preferred embodiment of the invention and, although specific terms are employed, they are used in a generic and descriptive sense only and not for purposes of limitation, the scope of the invention being defined in the claims.

We claim:

1. A truck body adapted to be mounted on the chassis of a truck comprising a bed, means for mounting said bed on said chassis, said bed having an opening in the rearmost portion thereof forming an elevator well, an elevator frame mounted in said well and having a portion extending beneath said well, an elevator platform movable in said well, a pair of generally arcuate links pivoted at opposite ends to the elevator platform and to the portion of said elevator frame extending beneath said well, a bell crank comprising a relatively long generally arcuate arm and a relatively short generally straight arm pivotally connected at their juncture to the portion of the elevator frame extending beneath the well at a point below the pivotal connection of the links thereto, the free end of the generally arcuate arm of the bell crank being pivotally connected to the elevator platform at a point beneath the pivotal connections of the links thereto, means for moving said elevator comprising an electric motor, a motor housing, a ram mounted in said housing and movable by said motor, said motor housing being pivotally connected to said truck body and the free end of said ram being pivotally connected to the free end of the relatively short arm of the bell crank, whereby the elevator platform may be raised and lowered in a generally arcuate path while maintaining a constant level attitude relative to the truck bed.

2. An automotive truck having a frame and a truck bed having a floor provided with an opening therein mounted on said frame and said truck also being provided with an ignition circuit and a source of electrical energy, improved means for loading cargo onto and off said truck bed comprising an electrically operable elevator associated with said automotive truck, said elevator including an electrically operable ram pivotally secured to said frame, an elevator platform adapted to mate with said opening in the truck bed, a plurality of reinforcing ribs on the under surface of said platform, each of said ribs having a downwardly extending ear formed integral with the medial portion thereof and at least two adjacent ears being of substantially greater length than the remainder of the ears, a plurality of shafts journaled at their respective ends in adjacent short ears, a plurality of arcuately extending parallel links, one end of each of said links being pivotally connected to one of said shafts, the other end of each of said links being pivotally connected to said frame, a bell crank pivotally connected at one of its ends to the outer free end of said ram and at its other end to said longer ears, the medial portion of said bell crank being pivotally connected to a portion of said frame adjacent said electrically operable ram, and manually operable electric control means for actuating said electrically operable ram to move said bell crank to raise and lower said elevator platform relative to said truck bed.

3. An automotive truck having a frame and a truck bed having a floor provided with an opening therein mounted on said frame and said truck also being provided with an ignition circuit and a source of electrical energy, improved means for loading cargo onto and off said truck bed comprising an electrically operable elevator associated with said automotive truck, said elevator including an electrically operable ram pivotally secured to said frame, an elevator platform adapted to mate with said opening in the truck bed, a plurality of reinforcing ribs on the under surface of said platform, each of said ribs having a downwardly extending ear formed integral with the medial portion thereof and at least two adjacent ears being of substantially greater length than the remainder of the ears, a plurality of shafts journaled at their respective ends in adjacent short ears, a plurality of arcuately extending parallel links, one end of each of said links being pivotally connected to one of said shafts, the other end of each of said links being pivotally connected to said frame, a bell crank pivotally connected at one of its ends to the shaft extending between said two longer ears, the other end of said bell crank being pivotally connected to the outer free end of said ram and the medial portion of said bell crank being pivotally connected to a portion of said frame adjacent said electrically operable ram, manually operable electric control means for actuating said electrically operable ram to move said bell crank to raise and lower said elevator platform relative to said truck bed, and switch means normally biased to move to open position disposed in one wall of the opening and connected in series in said ignition circuit and being closable when the platform is moved to fully raised position.

4. An automotive truck having a frame and a truck bed having a floor provided with an opening therein mounted on said frame and said truck also being provided with an ignition circuit and a source of electrical energy, improved means for loading cargo onto and off said truck bed comprising an electrically operable elevator associated with said automotive truck, said elevator including an electrically operable ram pivotally secured to said frame, an elevator platform adapted to mate with said opening in the truck bed, a plurality of reinforcing ribs on the under surface of said platform, each of said ribs having a downwardly extending ear formed integral with the medial portion thereof and at least two adjacent ears being of substantially greater length than the remainder of the ears, a plurality of shafts journaled at their respective ends in adjacent short ears, a plurality of arcuately extending parallel links, one end of each of said links being pivotally connected to one of said shafts, the other end of each of said links being pivotally connected to said frame, a bell crank pivotally connected at one of its ends to the shaft extending between said two longer ears, the other end of said bell crank being pivotally connected to the outer free end of said ram and the medial portion of said bell crank being pivotally connected to a portion of said frame adjacent said electrically operable ram, manually operable electric control means for actuating said electrically operable ram to move said bell crank to raise and lower said elevator platform relative to said truck bed, and switch means normally biased to move to open position disposed in one wall of the opening and connected in series in said ignition circuit and being closable when the platform is moved to fully raised position where the platform is level with the floor, said switch including a spring pressed plunger engageable by the elevator platform when said elevator platform is in fully raised position and movable by said platform to close the ignition circuit.

5. In an automotive truck having a frame and a truck bed mounted on said frame and said truck also being provided with a source of electrical energy, improved means for loading and unloading cargo on and off said truck bed comprising an electrically operable elevator associated with said automotive truck including an elevator platform pivotally connected to said frame, an electrically operated ram pivotally connected to said frame and to said elevator platform for imparting movement to said elevator platform to raise and lower the elevator platform relative to said truck bed, means for maintaining the horizontal angularity of the elevator platform constant relative to the horizontal angularity of the truck bed while raising and lowering the platform relative to the truck bed, the truck bed having an opening therein adapted to receive the elevator platform, cargo retaining means secured to the outer edges of said truck bed comprising a plurality of interconnected horizontally and vertically extending tubular members, improved latch means associated with at least some of said horizontally extending tubular members for releasably interconnecting the same to form a manually operable and removable gate in said cargo retaining means, said improved latch means comprising a pilot block pressed into a first end of a horizontally extending tubular member adapted to slidably fit in the proximate end of a first adjacent horizontally extending tubular member, a spring pressed plunger slidably mounted in the other end of said horizontally extending tubular member adapted to normally fit loosely in the proximate end of a second adjacent horizontally extending tubular member, and an operating handle secured to the medial portion of said plunger and extending outwardly in right angular relation thereto through said tubular member.

6. In an automotive truck having a chassis and a bed supported by the chassis and having a floor provided with an opening and said truck also having a source of electrical energy and an ignition circuit connected to said source of electrical energy; the combination of lift means having a platform adapted to loosely fit in said opening, a plurality of links pivotally connected at one of their ends to the platform and connected at their other ends to the bed and electrically driven means connected to at least one of said links for raising and lowering said platform, a switch in said circuit, a plunger extending from the switch and biased to normally open the circuit, said switch being mounted adjacent one of the walls of said opening with the plunger extending into said opening, and said plunger being engageable by the platform when it is moved into said opening to close the ignition circuit.

References Cited in the file of this patent

UNITED STATES PATENTS

| | | |
|---|---|---|
| 1,206,953 | Wales | Dec. 5, 1916 |
| 2,454,548 | Brinkert | Nov. 23, 1948 |
| 2,536,954 | Olsen | Jan. 2, 1951 |
| 2,579,003 | Josephian | Dec. 18, 1951 |
| 2,624,477 | Messick | Jan. 6, 1953 |
| 2,635,771 | Black | Apr. 21, 1953 |
| 2,639,625 | Geyer et al. | May 26, 1953 |
| 2,650,724 | Bill | Sept. 1, 1953 |
| 2,654,491 | Duis et al. | Oct. 6, 1953 |

FOREIGN PATENTS

| | | |
|---|---|---|
| 486,962 | Great Britain | June 14, 1938 |